(12) United States Patent
Cording et al.

(10) Patent No.: US 8,955,341 B2
(45) Date of Patent: Feb. 17, 2015

(54) METHOD AND EQUIPMENT FOR SERVICING COOLING SYSTEMS IN VEHICLES

(75) Inventors: Louis Cording, Sonderborg (DK); Bjarne Lund, Sonderborg (DK)

(73) Assignee: Mahle Clevite Inc., Ann Arbor, MI (US)

( * ) Notice: Subject to any disclaimer, the term of this patent is extended or adjusted under 35 U.S.C. 154(b) by 193 days.

(21) Appl. No.: 13/512,492

(22) PCT Filed: Nov. 30, 2010

(86) PCT No.: PCT/DK2010/000161
§ 371 (c)(1),
(2), (4) Date: Aug. 7, 2012

(87) PCT Pub. No.: WO2011/066833
PCT Pub. Date: Jun. 9, 2011

(65) Prior Publication Data
US 2012/0297799 A1 Nov. 29, 2012

(30) Foreign Application Priority Data

Dec. 1, 2009 (DK) ................................ 2009 01272
Apr. 19, 2010 (DK) ................................ 2010 00322
Sep. 13, 2010 (DK) ................................ 2010 00819

(51) Int. Cl.
*F25B 45/00* (2006.01)
*B60H 1/00* (2006.01)

(52) U.S. Cl.
CPC ........ *B60H 1/00585* (2013.01); *B60H 1/00257* (2013.01); *F25B 45/00* (2013.01); *F25B 2345/0052* (2013.01)

USPC ................................... 62/77; 62/149; 62/292

(58) Field of Classification Search
CPC ............ B60H 1/00257; B60H 1/00585; F25B 2345/0052; F25B 45/00
USPC ..................... 62/77, 149, 100, 292
See application file for complete search history.

(56) References Cited

U.S. PATENT DOCUMENTS

| 4,538,964 | A | * | 9/1985 | Brown ........................... 417/267 |
| 5,375,426 | A | * | 12/1994 | Burgener ........................... 62/85 |
| 6,314,749 | B1 | * | 11/2001 | Van Steenburgh, Jr. ......... 62/292 |
| 2003/0140779 | A1 | * | 7/2003 | Schwarzkopf et al. ........... 92/71 |
| 2005/0066679 | A1 | * | 3/2005 | Boyer et al. .................... 62/244 |
| 2007/0108403 | A1 | * | 5/2007 | Sievert et al. ................... 252/67 |

(Continued)

FOREIGN PATENT DOCUMENTS

| DE | 20 2005 019 890 | 5/2006 |
| DE | 20 2006 001 376 | 6/2007 |

(Continued)

OTHER PUBLICATIONS

International Search Report for PCT/DK2010/000161, dated Mar. 2, 2011.

(Continued)

*Primary Examiner* — Mohammad M Ali
(74) *Attorney, Agent, or Firm* — Rader, Fishman & Grauer PLLC

(57) ABSTRACT

In a method for servicing an air conditioning system of a motor vehicle, surrounding areas in which there is a risk of leakage of inflammable coolant is ventilated such that air in the surrounding areas is suctioned out and discharged from the surrounding areas.

4 Claims, 3 Drawing Sheets

(56) References Cited

U.S. PATENT DOCUMENTS

2007/0187638 A1\* 8/2007 Guilpain et al. ............... 252/67
2009/0188263 A1 7/2009 Murray et al.
2010/0158732 A1\* 6/2010 Sato et al. .................... 418/55.3

FOREIGN PATENT DOCUMENTS

| EP | 0 768 198 | 4/1997 |
|---|---|---|
| EP | 768198 A2 | 4/1997 |
| EP | 1515041 A1 | 3/2005 |
| JP | 2006271634 A | 10/2006 |
| JP | 2008061702 A | 3/2008 |

OTHER PUBLICATIONS

ATEX Directive No. 94/9/EU.

\* cited by examiner

METHOD AND EQUIPMENT FOR SERVICING COOLING SYSTEMS IN VEHICLES

BACKGROUND OF THE INVENTION

1. Field of the Invention

The present invention relates to a method of servicing cooling systems in vehicles, said servicing including suction, cleaning and subsequent adding of coolant to the air conditioning system, said coolant including inflammable coolants, as well as equipment and use thereof.

2. Description of the Related Art

Today, air conditioning systems in vehicles contain coolants which are not inflammable, and, therefore, servicing, i.e. suction, cleaning and adding of the coolant, may take place without any need for special safety measures.

However, these known coolants are a risk to the environment, since, when being discharged, they involve an increased greenhouse effect.

Therefore, it is endeavoured to provide alternative coolants which do not increase the greenhouse effect, and coolants are being developed which, however, are inflammable. This means that these new coolants cannot be serviced by the known methods, but require special safety measures in accordance with the ATEX Directive No. 94/9/EU. It is a matter of safety zones in the area around the inflammable vapours which are possibly discharged.

BRIEF SUMMARY OF THE INVENTION

It is an object of the invention to provide methods which satisfy the ATEX Directive using inflammable media, such as inflammable coolants, and this is achieved according to the invention by a method of servicing, where the areas in which there is a risk of leakage of inflammable agents, such as the area around the engine of the vehicle as well as the service equipment necessary for the servicing, are ventilated, so that the air in these areas is sucked out and discharged from the areas.

It is ensured in this manner that the areas in which there is a risk of occurrence of inflammable liquids, vapours, are reduced to comprise solely these inflammable zones, and therefore, it is possible to provide ventilation in a simple manner by suction and thus safe removal of inflammable components, which are discharged outside the service area via channels. Hereby, the safety requirements in the so-called Zone 2 area may be met in accordance with the Directive, thus making it possible in practice to service these inflammable coolants.

When the Zone 2 area around the engine of the vehicle is sucked out via a suction chamber or channel disposed below the engine, the safety requirements may be met, without this involving inconvenience to the service work in general.

When the Zone 2 area is ventilated around the service equipment, i.e. the equipment which sucks, cleans and adds coolant, and which is enclosed in a cabinet, the interior of this may be ventilated, which ensures that this zone, too, meets the safety requirements, without causing inconvenience to the service work in general.

When the method is applied to a filling station, which comprises the equipment necessary for the adding of coolant, and this is encapsulated in a cabinet which is sucked out, the Zone 2 requirements will be met, without the service work being impeded or rendered difficult by this.

When the equipment is controlled partly by subjecting it to vacuum, partly to pressure, it is ensured that the system is tight under all pressure conditions.

When the service equipment is provided in a ventilated cabinet with the necessary components, and the air is discharged from the cabinet via a hose to the exterior of the service building, an effective suction is achieved, and thereby a safely exhausted Zone 2 area around the service equipment.

Finally, it is expedient to use the method for both servicing of air conditioning systems and for adding coolant on a production line.

DETAILED DESCRIPTION OF THE INVENTION

Figure 1:
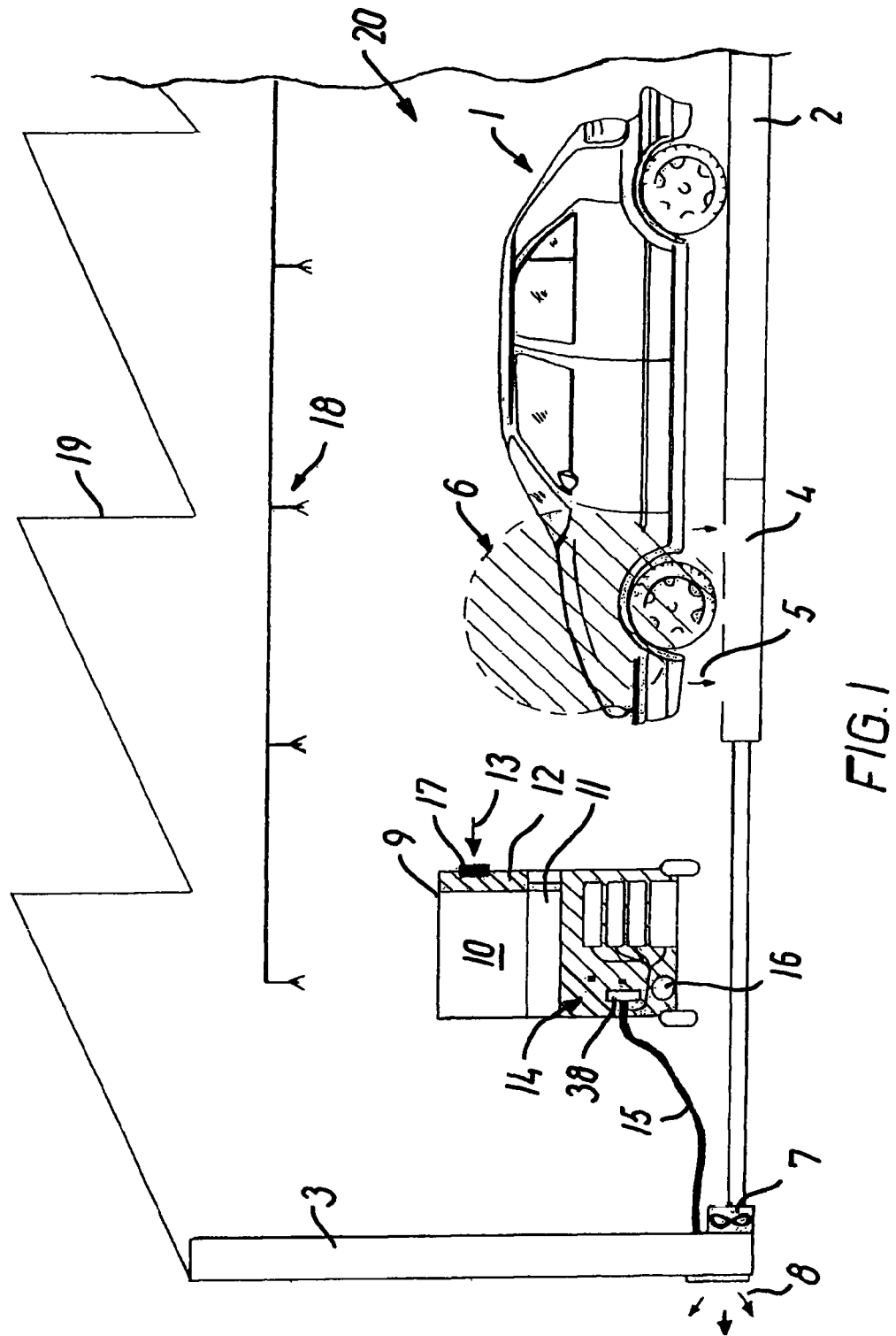
FIG. 1 shows a system for servicing a vehicle, with the Zone 2 area indicated by hatching.

The first example is a method of servicing a cooling system in a vehicle 1, as shown in FIG. 1.

The vehicle is shown disposed in a space 20 in a service building or the like with a roof 19 and walls 3. A sprinkler system with nozzles 18 is shown at the top.

The vehicle 1 is disposed such that the engine compartment is present above a suction trough 4. In the example shown, it is a front engine, but, of course, it might also be a rear engine.

The suction trough 4 is provided with inlet openings at the top, so that air from the space 20 may be sucked out, as indicated by arrows 5.

The suction takes place via a blower or ventilator 7, whose outlet side provides discharge of the air outside the wall 3, as indicated by arrows 8.

In the example shown, the service system is constructed as a wheeled cabinet 9. At the top of this cabinet, there is a room 10 for the electrical control, etc., at the side a room 12 for the service equipment, such as coupling parts, etc, and beneath a room 11 for components and the like. Various components are shown at the bottom of the system, such as a vacuum pump, a liquid container, etc., and also a differential pressure meter 16.

The cabinet 9 is partly ventilated, as air from the space 20 may be admitted through an opening 17 in the cabinet 9, as indicated by an arrow 13, so that the space shown hatched may be evacuated by means of a ventilator 38, via a suction hose 15, and the air is discharged from the service space 20, as indicated by arrows 8 in FIG. 1.

Figure 2:
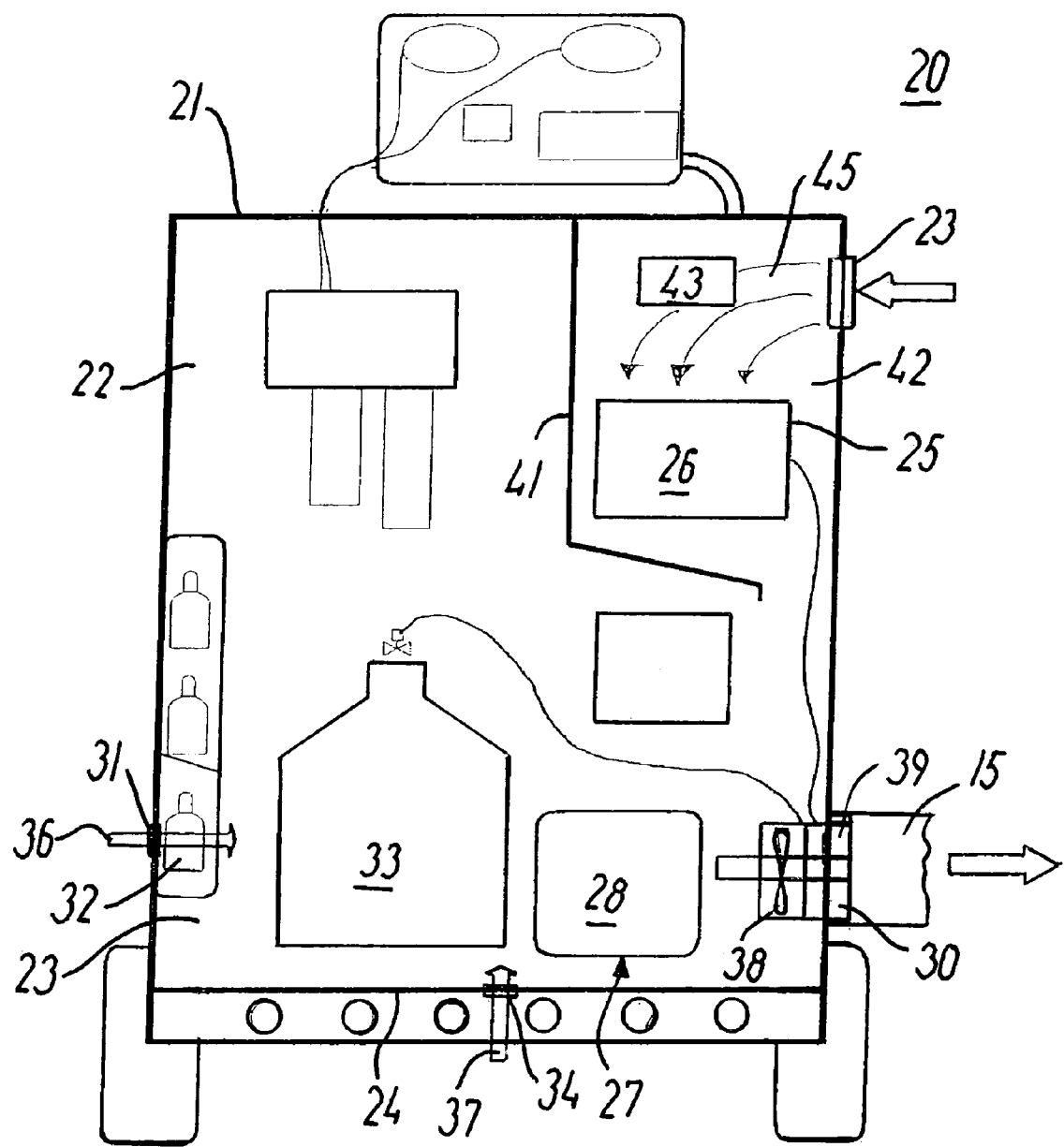
FIG. 2 shows a sectional view of service equipment with incorporated ventilator.

The service unit, as shown in FIG. 2, has a housing configured as a wheeled cabinet 21, with an interior with an upper 22 and a lower part 23 beneath the upper part 22, and with a bottom 24. Inside the cabinet 21, components are arranged for an emptying mechanism 25 for exhausting coolant or a compressor oil mixture from the cooling system, e.g. a vacuum pump 26, and components for a filling mechanism 27 for refilling a closed cycle of the cooling system e.g. a compressor 28.

A first air inlet opening 29 is provided on the upper part 22 of the cabinet 21, and a discharge opening 30 is provided on the lower part 23. In addition to the first part air inlet opening 29, a second air inlet opening 31 is provided, which is in front of a waste oil bottle 32. For instance, an internal cylinder 33 and the compressor 28 are arranged on the bottom 24 in the interior of the cabinet 21. Also a third inlet opening 34 is arranged in the bottom 24.

The interior of the cabinet 21 is ventilated by a ventilation system, as air from the outside space 20 around the cabinet 21 may be admitted through the air inlet openings 29, 31, 34 into the interior of the cabinet 21, as indicated by arrows 35 and 36 and by an arrow 37. It is also possible that more than three inlet openings may be provided.

The ventilation system comprises a ventilator 38 inside the cabinet 21. The ventilator 38 is arranged in front of the discharge opening 30. The outside of the cabinet 21 has arranged thereon a flange 39 around the discharge opening 30 for the fastening of a hose 15. Thereby, the air or inflammable gas or vapours are pressed out of the interior of the cabinet 21 by the blast pressure of the ventilator 38, as indicated by an arrow 40.

For a better flow of the fresh air behind the inlet opening 29, there is provided a guide sheet 41, which separates a zone 42 with electrical components, such as an electrical power supply 43 and the vacuum pump 26, from the whole area on the upper part 22. In order to eliminate the zone 42 around the electrical components 43 and the vacuum pump 28, the flow of fresh air is configured in such a way that fresh air shown by the arrow 35 from the outside of the service unit is sucked into the cabinet 21 through the first inlet opening 29 and thereby passes the electrical components 43 and the vacuum pump 26 in the area 42, as shown by arrows 45. In addition, in order to eliminate the inflammable zone around the internal cylinder 33 and the compressor 28 and the waste oil bottle 32, fresh air, as shown by arrows 36 and 37 are sucked from the outside of the service unit into the interior, thereby passing the components on the bottom 24, e.g. the internal cylinder 33 and the compressor 28 and the waste oil bottle 32 on the side wall.

The discharge opening 30 is connected with a hose 15 for discharging air from the interior of the cabinet 21 outside a service space, as shown by an arrow 8 in FIG. 1. The ventilator 38 acts such that fresh air from the outside of the service unit is sucked into the interior of the service unit through the inlet openings 29, 31, 34 and is pressed out through the discharge opening 30 and through the hose 15 outside a service building. Thereby, air contaminated with inflammable coolant, which may escape in the interior of the service unit 21, is pressed out of the interior of the service unit 21. Therefore, the contaminated air inside the cabinet is handled correctly.

With this equipment, the method according to the invention may be carried out in a such a manner that the ATEX Directive may be satisfied with the safety requirements which are made, as indicated in the shown example by the hatching, viz. a Zone 2 of minimum 1 meter around the engine and a Zone 2 in the cabinet 9, 21. Inflammable vapours from liquids, which may be ignited, may occur in these zones at servicing and perhaps because of leakages, etc.

By means of the ventilation possibilities described, viz. partly below the engine, partly through the cabinet, the requirements of the ATEX Directive may be met, without this causing work-related problems.

Now, the equipment shown in FIG. 3 will be described.

In the example shown, an air conditioning system is to be filled with an inflammable coolant in a so-called online production line, where the vehicle 52 is advanced on a belt 51.

Figure 3:
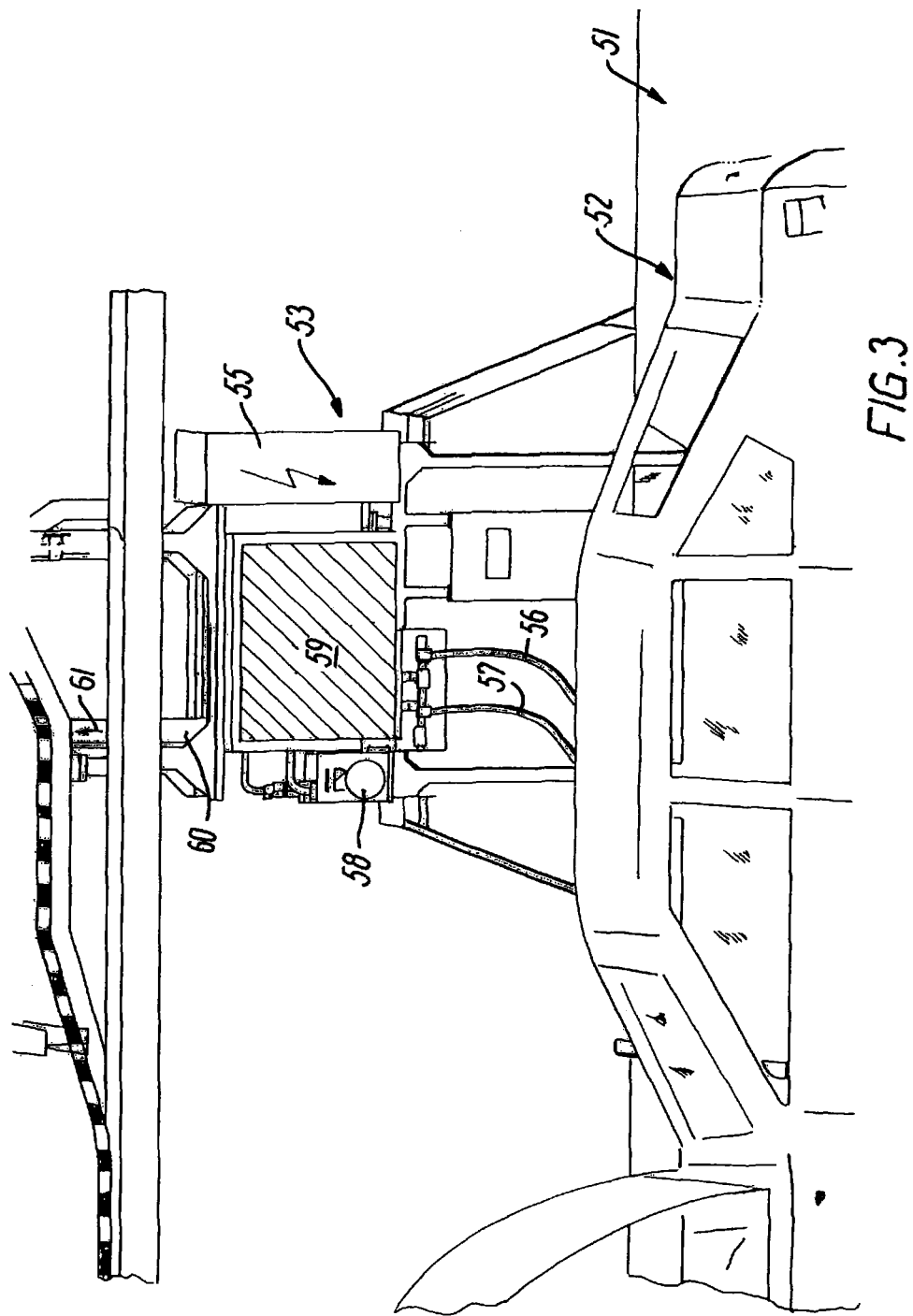
FIG. 3 shows adding of coolant on a production line, in which the Zone 2 area is likewise hatched.

FIG. 3 shows a filling station 53 as a suspension for a cabinet comprising an electrical cabinet 55, a classified and ventilated room 59, which is hatched to indicate that it is a Zone 2 room, a liquid pump 58 as well as a high pressure line 56 and a low pressure line 57 for a filling adaptor (not shown).

It is noted that with this production line there is no Zone 2 around the engine, as the zone is exclusively present inside the ventilated room 59 and the lines 56 and 57.

The Zone 2 area 59 in the cabinet is connected with a ventilation system at the top via a ventilation channel 60, so that the air present in the cabinet 59 may be sucked out, as indicated by arrows 61. It is ensured thereby that the cabinet satisfies the safety zone requirements in accordance with the ATEX Directive.

The online filling may therefore take place in a safe manner, without this involving any inconvenience to the work.

For the control of the system, including the tightness of the couplings, the filling system may be subjected to partly a vacuum, partly a positive pressure with a view to controlling its tightness. Hereby, it is ensured in a simple manner that the system is completely tight under all conditions of operation.

The equipment according to the invention may readily be installed in existing service systems, as this does not require material changes, but just installation of the necessary ventilation equipment.

The invention claimed is:

1. A method of servicing an air conditioning system in a motor vehicle, comprising:
   suctioning existing inflammable coolant from the air conditioning system;
   cleaning the air conditioning system after the suctioning; and
   subsequently adding, using a filling system, replacement inflammable coolant to the air conditioning system;
   wherein surrounding areas of the air conditioning system are ventilated such that air in the surrounding areas is suctioned out and discharged from the surrounding areas, wherein the surrounding areas include at least the locations of (i) an engine of the motor vehicle, and (ii) a housing for enclosing at least the filling system; and
   wherein the vehicle is placed in a service space within the housing, the housing having a suction trough such that the suction trough is positioned directly below the engine of the motor vehicle, wherein the suction trough is connected to a ventilator via an air channel, and wherein air is suctioned out of the service space via the suction trough and the connected air channel by the ventilator.

2. The method according to claim 1, wherein:
   the housing is defined by a closed cabinet having (i) at least one air inlet to the interior of the cabinet, and (ii) a second ventilator connected with a hose; and
   the air is suctioned out of the closed cabinet via the hose connected to the second ventilator.

3. The method according to claim 1, wherein:
   the housing is a closed cabinet; and
   the interior of the closed cabinet is ventilated by a ventilation system having at least one channel for removing air from the interior of the closed cabinet.

4. The method according to claim 3, wherein:
   during the servicing, a control of the tightness of the closed cabinet and the at least one channel is performed by subjecting the closed cabinet and the at least one channel to at least one of vacuum and pressure.

* * * * *